United States Patent [19]

Inoue

[11] Patent Number: 5,201,115
[45] Date of Patent: Apr. 13, 1993

[54] METHOD OF MANUFACTURING CYLINDER BLOCK OF AN ENGINE

[75] Inventor: Yasushi Inoue, Hiroshima, Japan

[73] Assignee: Mazda Motor Corporation, Hiroshima, Japan

[21] Appl. No.: 757,634

[22] Filed: Sep. 11, 1991

[30] Foreign Application Priority Data

Sep. 17, 1990 [JP] Japan .................. 2-246869
May 13, 1991 [JP] Japan .................. 3-107448

[51] Int. Cl.$^5$ ........................................ B23P 15/00
[52] U.S. Cl. ................................ 29/888.01; 29/445
[58] Field of Search .............. 29/888.01, 445, 525.1, 29/527.6, 558

[56] References Cited

U.S. PATENT DOCUMENTS 3,173,407 3/1965 Sampietro et al. ............. 29/888.01
4,699,100 10/1987 Leydor, Jr. et al. ............ 29/888.01
5,063,661 11/1991 Lindsay ............................... 29/445

*Primary Examiner*—Irene Cuda
*Attorney, Agent, or Firm*—Sixbey, Friedman, Leedom & Ferguson

[57] ABSTRACT

A cylinder block for an engine is formed of a cylinder block body and a lower block which are cast from aluminum alloy and are fastened together to support therebetween a crankshaft of the engine. The upper half of a bearing portion for supporting the crankshaft is provided in the cylinder block body and the lower half of the bearing portion is formed by a bearing cap cast in the lower block. A method of manufacturing the cylinder block includes the steps of casting the cylinder block body and the lower block with the bearing cap cast in the lower block, fastening together the cylinder block body and the lower block by bolts, performing primary stage finishing of the bearing portion with the cylinder block body and the lower block kept fastened together, releasing the lower block from the cylinder block body after the primary stage finishing of the bearing portion and permitting the lower block to deform under stress produced by shrinkage of aluminum alloy, fastening again the cylinder block body and the lower block together by the bolts, and performing final stage finishing of the bearing portion with the cylinder block body and the lower block kept fastened together.

4 Claims, 6 Drawing Sheets

METHOD OF MANUFACTURING CYLINDER BLOCK OF AN ENGINE

BACKGROUND OF THE INVENTION

1. Field of the Invention

This invention relates to a method of manufacturing a cylinder block of an engine.

2. Description of the Prior Art

There has been known a cylinder block which is cast from a light alloy such as aluminum. The cast cylinder block of the light alloy is less rigid than that of cast iron, and accordingly, when the journal portion of a crankshaft is directly supported by the light alloy, the bearing portion can be deformed and, at the same time, wear resistance and bearing strength are lacking. Thus it has been proposed, in Japanese Unexamined Patent Publication No. 61(1986)-45108, to cast bearing caps in a lower block and to fasten the lower block to a cylinder block body to support the crankshaft, thereby increasing the strength of the bearing portion.

Conventionally the cast-in type lower block is once fastened to the block body before the crankshaft and the like is incorporated, and the bearing portion is machined in arch a manner as to obtain a predetermined degree of roundness of the bearing portion. However, in such a conventional method of manufacturing the cylinder block, the roundness of the bearing portion can deteriorate when the lower block is removed from the block body, after machining, in order to incorporate the crankshaft and the like.

That is, the bearing cap cast in the lower block is stressed and deformed by the shrinkage stress produced as the aluminum alloy cools after casting. Even if the bearing portion is machined to a predetermined degree of roundness, with the lower block fastened to the block body to suppress the deformation under the stress, the bearing portion can be deformed and the roundness thereof can deteriorate under residual stress when the lower block is removed from the block body, since the strength of the bearing cap is reduced by the machining. Consequently, when the lower block is fastened to the block body with the crankshaft supported therebetween, the clearance between the bearing portion and the bearing metal cannot be uniform and an oil film cannot be uniformly provided.

SUMMARY OF THE INVENTION

In view of the foregoing observations and description, the primary object of the present invention is to provide a method of manufacturing a cylinder block of an engine having a cast-in bearing cap which can ensure a high degree of roundness of the bearing portion.

In accordance with the present invention, there is provided a method of manufacturing a cylinder block for an engine comprising a cylinder block body and a lower block which are cast from an aluminum alloy and are fastened together to support, therebetween, a crankshaft of the engine, the upper half of a bearing portion for supporting the crankshaft being provided in the cylinder block body and the lower half of the bearing portion being formed by a bearing cap cast in the lower block. The method comprises the steps of casting the cylinder block body and the lower block, with the bearing cap cast in the lower block, fastening together the cylinder block body and the lower block by bolts, performing a primary stage finishing of the bearing portion, with the cylinder block body and the lower block kept fastened together, releasing the lower block from the cylinder block body after the primary stage finishing of the bearing portion, and permitting the lower block to be deformed under the stress produced by the shrinkage of an aluminum alloy, fastening again the cylinder block body and the lower block together by the bolts, and performing a final stage finishing of the bearing portion.

In accordance with the present invention, since the lower block is once released from the block body after the primary stage finishing and is permitted to be deformed under the stress produced by the shrinkage of the aluminum alloy before the final stage finishing is performed and reduction in the strength of the bearing cap due to machining in the final stage finishing is negligible, the bearing cap cannot be deformed any more even if the lower block is released from the block body in order to incorporate the crankshaft. Thus, in accordance with the present invention, an excellent roundness of the bearing portion can be ensured.

When the lower block is released from the block body, the former need not be completely removed from the latter so long as the former can be deformed under the stress produced by the shrinkage of the aluminum alloy without being suppressed by the latter. For example, the lower block may be connected to the block body by way of the bolts so long as the bolts are loosened and the lower block is released from the block body to such an extent that the lower block can freely be deformed.

DESCRIPTION OF THE PREFERRED EMBODIMENT

Figure 1:
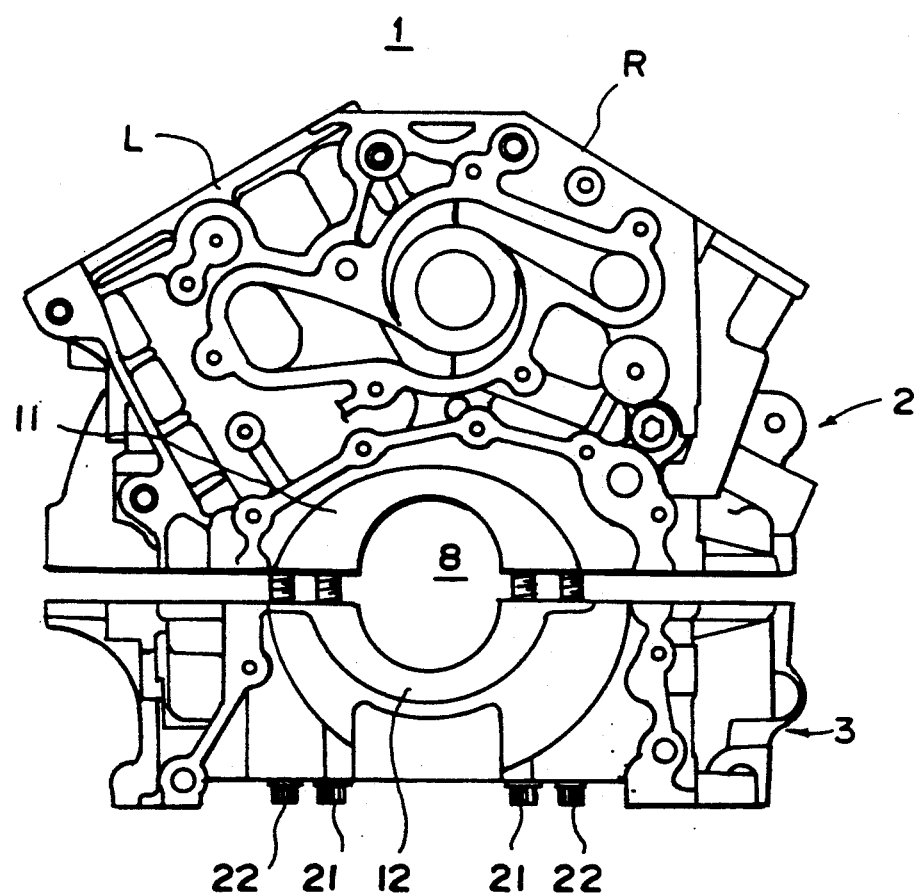
FIG. 1 is a front view of a cylinder block of a V-type engine to which the method of the present invention is applied.

In FIG. 1, a cylinder block 1 for a V-type engine is divided into a block body 2 and a lower block 3 at the center of bearing portions 8 for supporting a crankshaft (not shown). The block body 2 has right and left cylinder banks R and L which are at an angle to each other.

The block body 2 and the lower block 3 are cast from an aluminum alloy. The upper half of each of the bearing portions 8 is formed of a bearing member 11, and the lower half of the same is formed of a bearing cap 12. Though not shown in detail, the bearing member 11 comprises a semi-cylindrical bearing portion and a pair of fastening portions extending in opposite directions from the lower end portion of the bearing portion. The bearing members 11 are made of iron or an iron alloy and are cast in front and rear wall portions and partition wall portions (bulk head) between cylinders of the block body 2.

Figure 2:
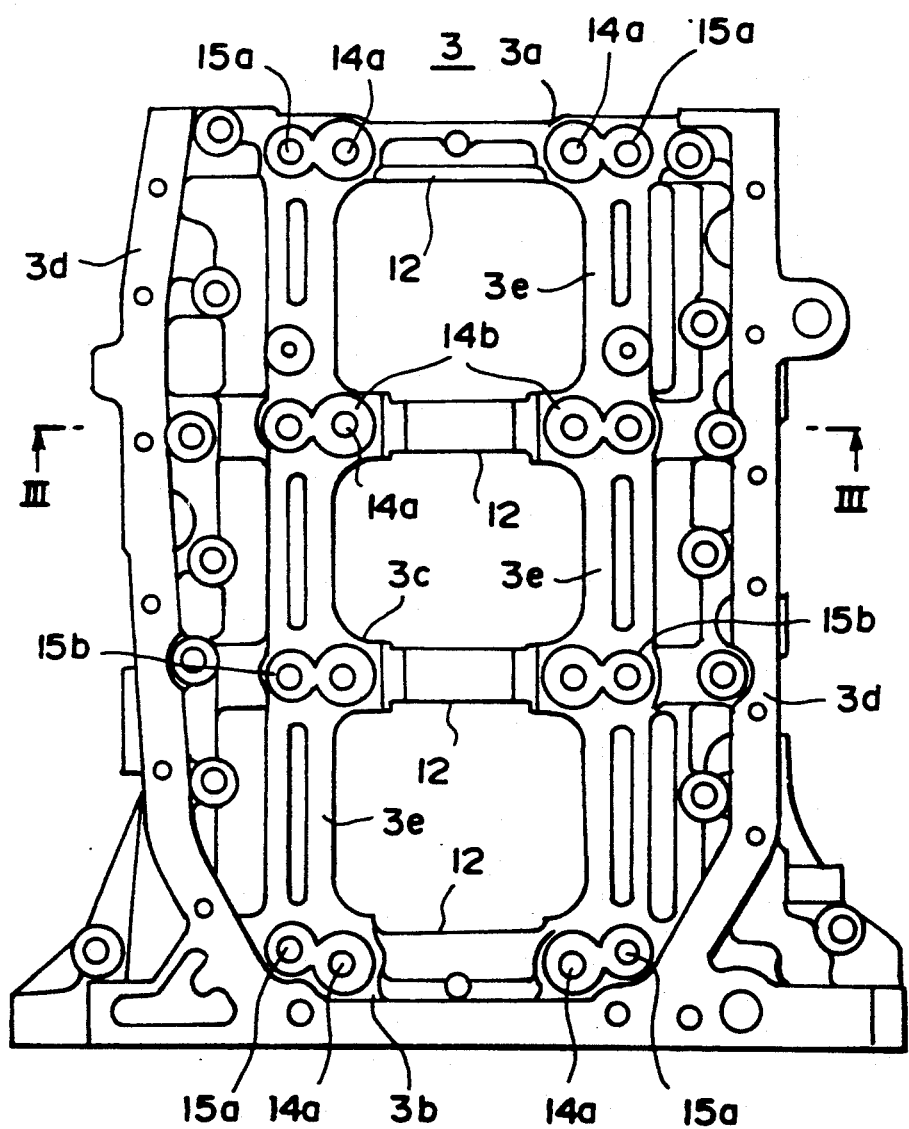
FIG. 2 is a bottom view of the lower block of the cylinder block.
Figure 3:
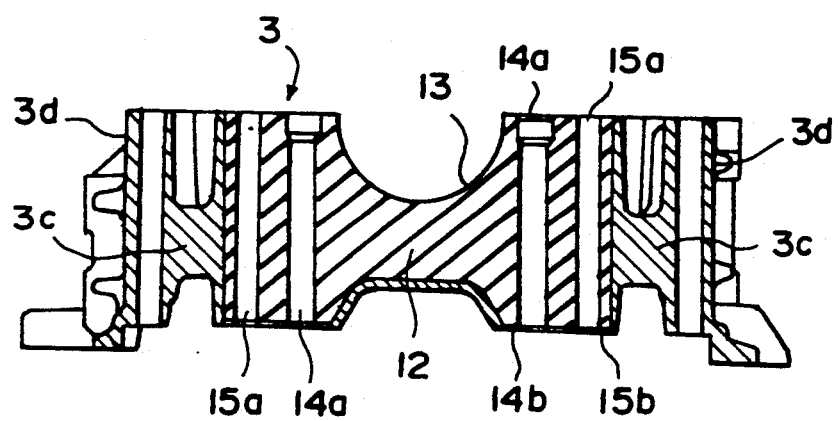
FIG. 3 is a cross-sectional view taken along line III—III in FIG. 2.
Figure 4:
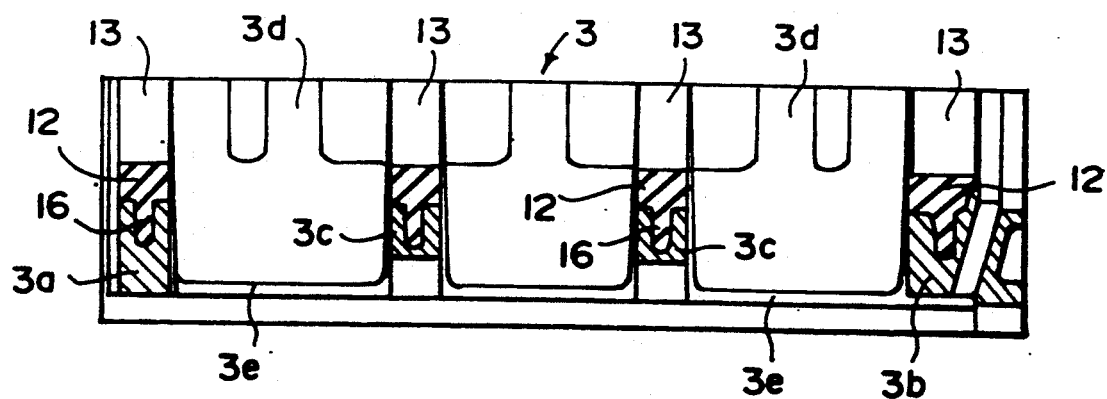
FIG. 4 is a longitudinal cross-sectional view of the lower block.

The bearing caps 12 are made of iron or an iron alloy and are cast in a front wall portion 3a (see also FIGS. 2 to 4), a rear wall portion 3b and partition wall portions 3c of the lower block 3. The wall portions 3a to 3c are connected to left and right side wall portions 3d, and connecting wall portions 3e extend between the wall portions 3a to 3c in the longitudinal direction of the lower block 3.

Figure 5:
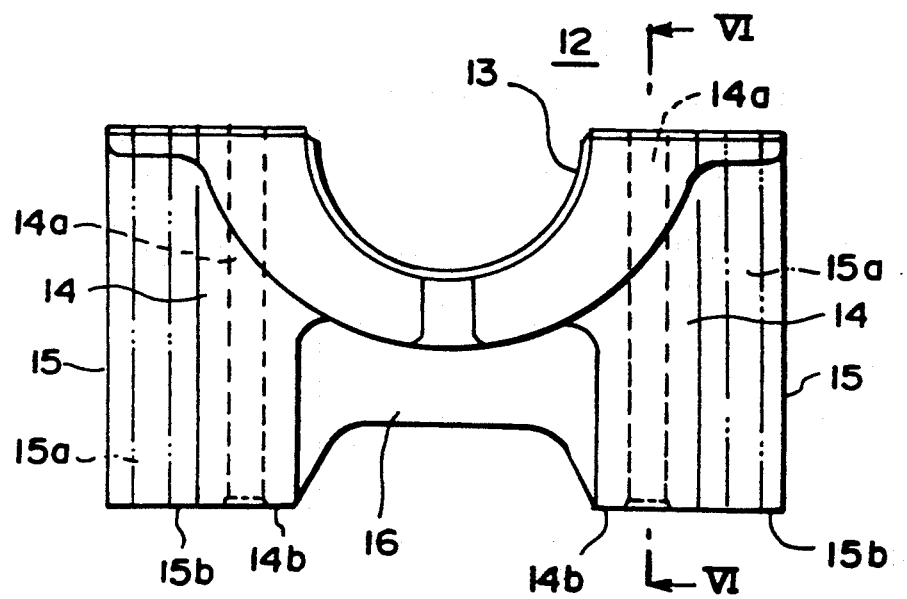
FIG. 5 is a front view of the bearing cap.
Figure 6:
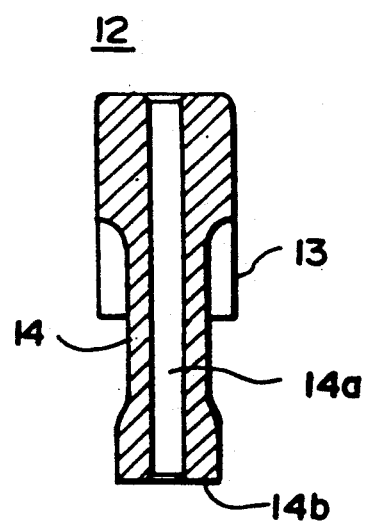
FIG. 6 is a cross-sectional view taken along line VI—VI in FIG. 5.

As shown in FIGS. 5 and 6, the bearing cap 12 comprises a semi-cylindrical bearing portion 13, and large and small boss portions 14 and 15 extend downward on each side of the bearing portions 13. The small boss portion 15 is disposed on the inner side of the large boss portion 14. Each of the large boss portions 14 is provided with a through hole 14a through which a fastening bolt 22 is inserted, and each of the small boss portions 15 is provided with a through hole 15a through which a fastening bolt 21 is inserted. Bolt seats 14b and 15b are formed at the lower ends of the through holes 14a and 15a. The through holes 15a are drilled after the casting of the lower block 3. A rib 16 connects the large boss portions 14 and the bearing portion 13.

The lower block 3 is fastened to the block body 2 by the bolts 21 and 22 which are inserted through the through holes 14a and 15a for each bearing portion 8.

Now a method of manufacturing the cylinder block 1 in accordance with an embodiment of the present invention will be described with reference to FIG. 8, hereinbelow.

As the first step, the block body 2 and the lower block 3 are cast from an aluminum alloy with the bearing member 11 and the bearing cap 12 cast respectively in the block body 2 and the lower block 3. The through hole 14a of each of the large boss portions 14 functions as a locator for positioning the bearing cap 12 with respect to the casting mold.

The lower ends of the boss portions 14 and 15 on opposite sides of each bearing cap 12 are stressed and deformed inward and the upper end portions of the bearing portion of each bearing cap 12 are stressed and deformed outward by the shrinkage stress produced as the aluminum alloy cools after casting.

Thereafter (as the second step) the lower block 3 is fastened to the block body 2 by bolts 21 and 22 as shown in FIG. 1.

In the fastened state, the bearing members 11 and the bearing caps 12 are machined so that the internal diameter of the bearing portions 8, each defined by the bearing member 11 and the bearing cap 12, become a predetermined value and the roundness of each bearing portion 8 is improved. That is, as the third step, a primary stage finishing is performed. In the primary stage finishing, rough finishing and intermediate finishing are performed. For example, when the inner diameter of the bearing portion 13 of the bearing cap 12 as cast is 62 mm and the bearing portion 13 is to be machined to 66 mm, the bearing portion 13 is machined to 65.8 mm in the primary stage finishing.

Figure 7:
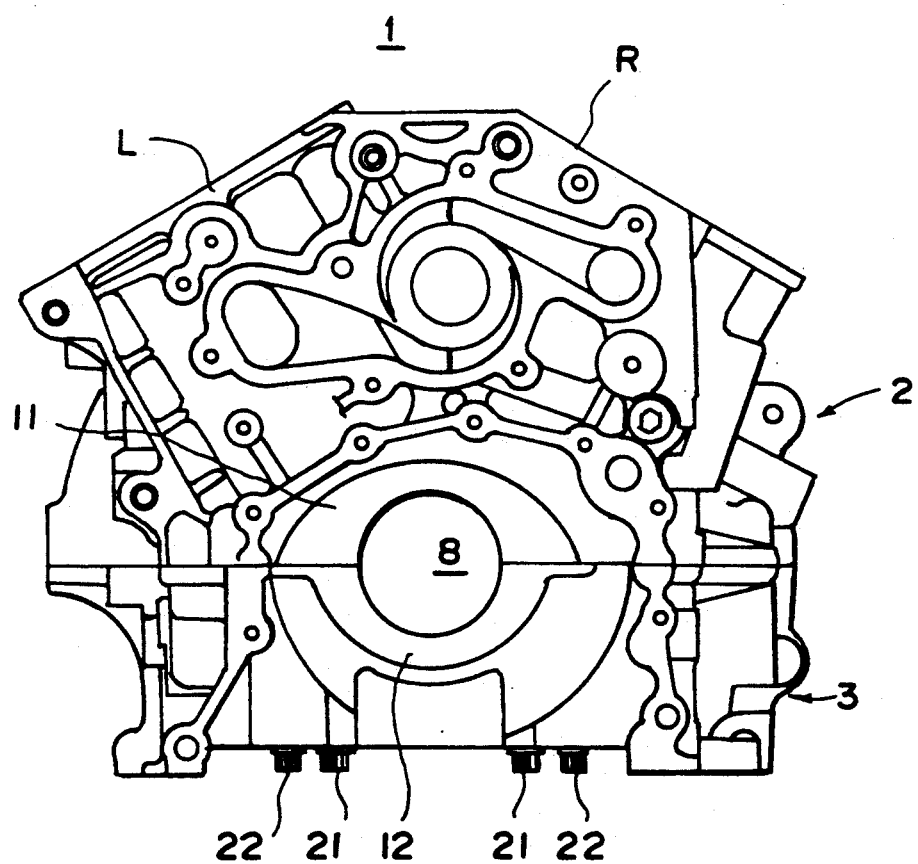
FIG. 7 is a front view showing the state in which the block body and the lower block are left to stand after the primary stage finishing in a method of manufacturing a cylinder block in accordance with a first embodiment of the present invention.

After the third step, (as the fourth step) the bolts 21 and 22 are loosened by a predetermined amount and vibration is applied to the lower block 3 by hitting the side walls of the lower block 3 with a pitch hammer or the like, whereby the lower block 3 is released from the block body 2 and is moved away therefrom as shown in FIG. 7. The lower block 3 is left to stand in this state and is permitted to be deformed under the residual stress. When the bolts 21 and 22 are simply loosened, the lower block 3 can still be in surface-to-surface contact with the block body 2 and cannot be sufficiently deformed under the residual stress. Therefore, an impact is applied to the lower block 3 with a hammer or the like, in order to sufficiently release the lower block 3 from the block body 2.

Then, as the fifth step, the bolts 21 and 22 are tightened again to fasten the lower block 3 to the block body 2 once more. Thereafter, the bearing portion 8 is subjected to a final stage finishing (as the sixth step). For example, the bearing ,portion 13 is machined to the final size, 66 mm, and to the final roundness in the final stage finishing.

While the bearing portion 8 is subjected to the final stage finishing, the through holes 15a in the small boss portions 15 are drilled and the through holes 14a in the large boss portion 15 are reformed and straightened.

In the lower block 3 wherein the bearing cap 12 of iron or an iron alloy is cast, the bearing cap 12 is deformed under the residual stress produced as the aluminum alloy shrinks after casting, the amount of deformation of the bearing cap 12 depending on the rigidity of the bearing cap 12. When the bearing portion 8 is finished to the final stage, with the lower block 3 fastened to the block body 2 not to permit the deformation of the lower block 3 as in the conventional method, the lower block 3 is deformed and the roundness of the bearing portion 8 deteriorates when the lower block 3 is removed from the block body 2, in order to incorporate the crankshaft and the like, since the rigidity of the bearing cap 12 has been changed by the machining. In accordance with the present invention, the lower block 3 is once, released from the block body 2 and is permitted to be deformed in the course of the finishing, and accordingly, the roundness of the bearing portion 8 does not change after the final stage finishing. That is, the degrees of finish in the primary stage finishing and the final stage finishing should be determined taking into account the amount of deformation which occurs when the lower block 3 is once released from the block body 2.

Figure 8:
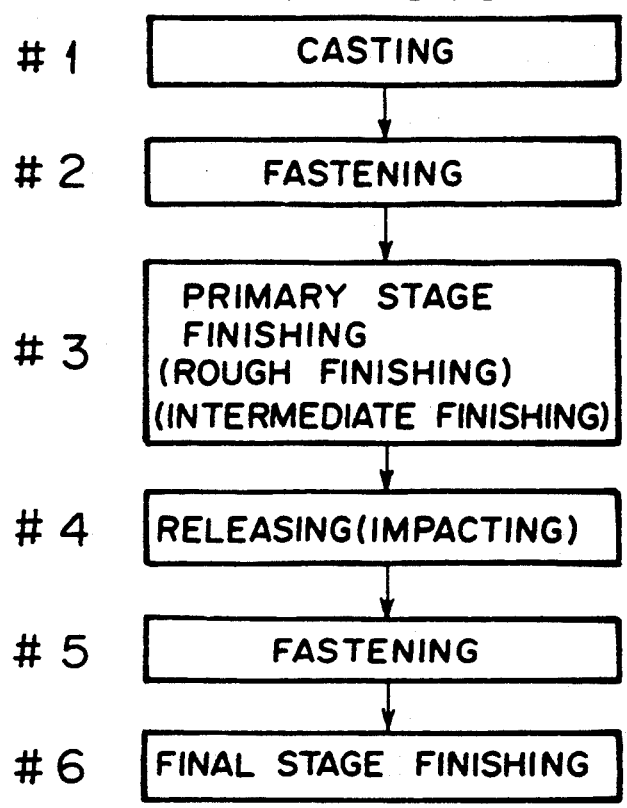
FIG. 8 is a block diagram for illustrating a method of manufacturing a cylinder block in accordance with the first embodiment of the present invention.
Figure 9:
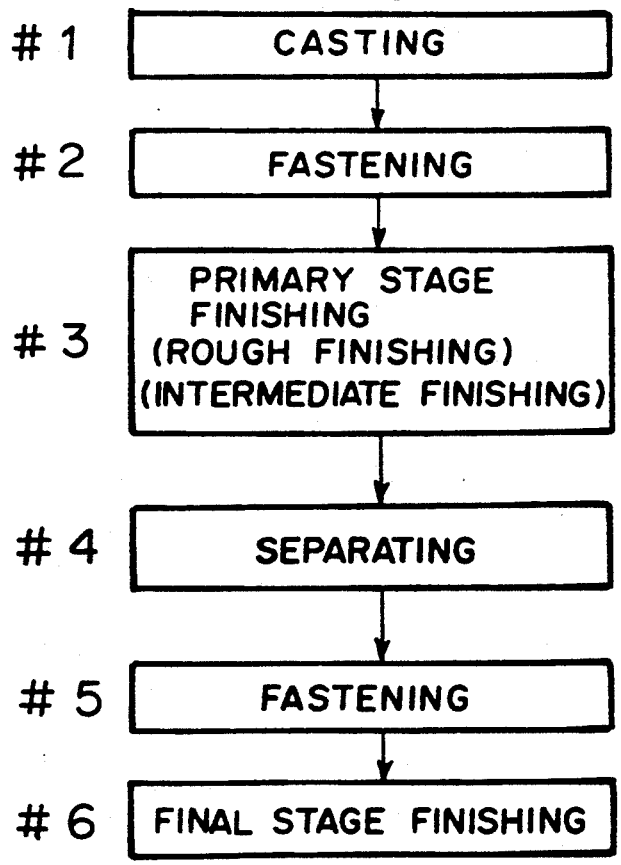
FIG. 9 is a block diagram for illustrating a method of manufacturing a cylinder block in accordance with a second embodiment of the present invention.

Though, in the embodiment, shown in FIG. 8, the lower block 3 is released from the block body 2 by loosening the bolts 21 and 22 but is still connected to the block body 2 by way of the bolts 21 and 22, the bolts 21 and 22 may be completely drawn out from the block body 2 and the lower block 3 may be completely removed or separated from the, block body 2 to permit the bearing cap 12 to be deformed under the residual stress as shown in FIG. 9.

However the method shown in FIG. 8 is advantageous over the method shown in FIG. 9 in that the number of steps is less and the production efficiency is higher.

Though the method of the present invention is described above in conjunction with a V-type engine, the present invention can also be applied to other types of engines such as an in-line engine.

What is claimed is:

1. A method of manufacturing a cylinder block for an engine comprising a cylinder block body and a lower block which are cast from an aluminum alloy and are fastened together to support therebetween a crankshaft of the engine, the upper half of a bearing portion for supporting the crankshaft being provided in the cylinder block body and the lower half of the bearing portion being formed by a bearing cap cast in the lower block, said method comprising the steps of;

casting the cylinder block body and the lower block with the bearing cap cast in the lower block, fastening together the cylinder block body and the lower block by bolts, performing primary stage finishing of the bearing portion with the cylinder block body and the lower block kept fastened together, releasing the lower block from the cylinder block body after the primary stage finishing of the bearing portion and permitting the lower block to deform under stress produced by shrinkage of the aluminum alloy, fastening again the cylinder block body and the lower block together by the bolts, and performing final stage finishing of the bearing portion with the cylinder block body and the lower block kept fastened together.

2. A method as defined in claim 1 in which the lower block is released from the cylinder block body after the primary stage finishing of the bearing portion by loosening the bolts and is permitted to deform while kept suspended from the cylinder block body by the bolts.

3. A method as defined in claim 2 in which the lower block is impacted after the bolts are loosened so that the surfaces of the lower block and the cylinder block body which are in contact with each other when the lower block and the cylinder block body are fastened together move away from each other.

4. A method as defined in claim 1 in which the lower block is released from the cylinder block body after the primary stage finishing of the bearing portion by loosening and drawing out the bolts and completely separating the lower block from the cylinder block body.

* * * * *